United States Patent [19]
Ottesen et al.

[11] Patent Number: 5,654,747
[45] Date of Patent: Aug. 5, 1997

[54] INTELLIGENT MULTIMEDIA SET-TOP CONTROL METHOD AND APPARATUS IN WHICH BILLING SIGNALS ARE COMMUNICATED TO AN INFORMATION NETWORK UPON PRESENTATION OF DOWNLOADED MEDIA PROGRAMS

[75] Inventors: Hal Hjalmar Ottesen; Gordon J. Smith; George Willard VanLeeuwen, all of Rochester, Minn.

[73] Assignee: International Business Machines Corporation, Armonk, N.Y.

[21] Appl. No.: 366,268

[22] Filed: Dec. 29, 1994

[51] Int. Cl.$^6$ .................... H04N 7/10; H04N 7/14
[52] U.S. Cl. .................... 348/12; 348/5; 348/10; 455/2; 455/5.1; 455/6.2; 455/6.3
[58] Field of Search .................... 348/1, 3, 5, 7, 348/10, 12, 13, 6; 455/2, 4.1, 4.2, 5.1, 6.2, 6.3, 3.1, 6.1; H04N 7/10, 7/14

[56] References Cited

U.S. PATENT DOCUMENTS

| | | | |
|---|---|---|---|
| 4,422,093 | 12/1983 | Pargee, Jr. | 348/7 |
| 4,499,568 | 2/1985 | Gremillet | 369/30 |
| 4,506,387 | 3/1985 | Walter | 359/118 |
| 4,949,187 | 8/1990 | Cohen | 386/69 |
| 5,075,771 | 12/1991 | Hashimoto | 348/13 |
| 5,133,079 | 7/1992 | Ballantyne et al. | 455/4.1 |
| 5,247,347 | 9/1993 | Litteral et al. | 348/7 |
| 5,285,272 | 2/1994 | Bradley et al. | 348/6 |
| 5,329,590 | 7/1994 | Pond | 455/4.2 X |
| 5,572,442 | 11/1996 | Schulhof et al. | 348/7 |

Primary Examiner—John K. Peng
Assistant Examiner—John W. Miller
Attorney, Agent, or Firm—Mark A. Hollingsworth

[57] ABSTRACT

A method and apparatus for effectuating the reception and local storage of source information signals representative of a media program transmitted from a source information network preferably over a cable television channel on a pay-per-view basis is disclosed. A local intelligent set-top control unit communicates with a remote information network and a local storage device to coordinate the transmission of customer ordered media programs from the information network for storage on the local storage device. The local storage device is preferably a standard video cassette recorder (VCR) providing full VCR control functionality when presenting a stored media program on a television. A digital or optical data storage disk drive system may alternatively be employed to store source information signals downloaded from the remote information network. The intelligent set-top control unit communicates a pay-per-view billing signal to the information network upon playing of a downloaded media program, and provides protection against unauthorized copying. In an alternative configuration, a set-top control card is installed into a host computer system to coordinate the reception and local storage of downloaded media programs, and preferably provides a platform for interfacing with other home communication and electronic systems.

29 Claims, 6 Drawing Sheets

INTELLIGENT MULTIMEDIA SET-TOP CONTROL METHOD AND APPARATUS IN WHICH BILLING SIGNALS ARE COMMUNICATED TO AN INFORMATION NETWORK UPON PRESENTATION OF DOWNLOADED MEDIA PROGRAMS

FIELD OF THE INVENTION

The present invention relates generally to communication systems, and, more particularly, to a set-top control method and apparatus for providing customer selected multimedia programming on a pay-per-view basis.

BACKGROUND OF THE INVENTION

Advancements in communications technology and increased consumer sophistication have challenged the distributors of multimedia programming to provide the public with entertainment services more convenient and accessible than those traditionally made available over cable television and telephone systems. An improving communications infrastructure has resulted in the proliferation of pay-per-view media services in most of the larger broadcast markets. Most pay-per-view systems permit the consumer to choose from a relatively small number of motion picture selections for home viewing, which are generally presented only at pre-scheduled viewing times.

A number of on-demand video services have been developed that permit the consumer to order desired programs for home viewing through the household telephone line. For example, U.S. Pat. No. 5,247,347, assigned to Bell Atlantic Network Services, discloses a sophisticated video-on-demand telephone service that provides consumer ordered video programming to a plurality of households through use of a public switched telephone network (PSTN). An extensive discussion regarding the inherent deficiencies of communicating video and other multimedia signals over standard bandwidth limited analog telephone lines is provided in the '347 patent.

The video-on-demand system disclosed in the '347 patent and other conventional telephony-based multimedia services fail to satisfactorily address the adverse impact to home communications during periods of prolonged program viewing. For example, a typical theatrical motion picture can tie up the household telephone line for over two hours. Further, such sophisticated telephony-based multimedia services generally require procurement of expensive communications and diagnostic equipment by the pay-per-view provider to ensure a reasonable level of signal quality and system reliability. These and other related operating expenses, however, are typically passed on to the consumer.

Importantly, conventional telephony-based multimedia services fail to provide media presentation control features now expected by the sophisticated consumer after enjoying more than a decade of home entertainment through the use of the video cassette recorder (VCR). Functions such as fast forward, reverse, and pause, for example, are standard presentation control functions now provided by all or most home VCRs, and are typically effectuated by use of an infrared (IR) remote control handset. The inherent limitations in the transmission bandwidth of conventional telephone lines, as well as conventional cable television channels, generally can not accommodate full VCR-type control functionality when employed to support a multimedia communication system adapted to provide pay-per-view service to a large number of subscribing customers.

In FIG. 1, there is illustrated a conceptualized block diagram of a conventional pay-per-view communication service for providing multimedia program distribution to a plurality of households over a public switched telephone network. Movies are typically stored on one or more media servers 10, each of which is multiplexed to the PSTN 16. A telephonic ordering system 14 is generally coupled to the PSTN 16 and provides a means for accepting a pay-per-view order from a customer or user 20. Upon verifying the account status of a user 20, the media server 10 typically transmits the ordered movie or program to a decoder box 22 coupled to the customer's telephone line 18. The transmitted program is continuously decoded by the decoder box 22 during the presentation of the selected program on the customer's television 24. Limitations in the transmission bandwidth of the telephone lines 18, as well as limitations in the switching capability of the PSTN 16, generally preclude the use of a PSTN 16 to support a multimedia communication system that provides high quality, full motion video signal transmission with full VCR-type control functionality.

It is believed that approximately seventy-three percent (73%) of all homes in the United States have at least one VCR. Most VCRs have a purchase price in the range of $250 to $400, representing a sizable luxury investment for most consumers. As discussed previously, most VCRs are controlled by use of an IR remote control handset, allowing the user to control the presentation of a video program using various control modes such as reverse, pause, and fast forward, for example. Conventional pay-per-view communication services, in contrast to viewing programs on a home VCR, generally require the customer to pay relatively large premiums on a monthly basis and yet do not provide basic VCR-type functionality inherent in the customer's home VCR.

There exists a need in the pay-per-view communications industry for a relatively simple system that capitalizes on the investment made by most consumer's in their home VCR, and one that provides VCR-type control over the presentation of a selected program. There exists a further need to provide a multimedia communication system that can efficiently distribute programming to a plurality of customers without requiring complex and typically expensive networking hardware and software at the communication distribution center. The present invention fulfills these and other needs.

SUMMARY OF THE INVENTION

The present invention is a method and apparatus for effectuating the reception and local storage of source information signals representative of a media program transmitted from a source information network preferably over a television communication channel on a pay-per-view basis. A local intelligent set-top control unit communicates with a remote information network and a local storage device to coordinate the transmission of customer ordered media programs from the information network for storage on the local storage device. The local storage device is preferably a standard video cassette recorder (VCR) providing full VCR control functionality when presenting a stored media program on a television. A digital or optical data storage disk drive system may alternatively be employed to store source information signals downloaded from the remote information network. The intelligent set-top control unit communicates a pay-per-view billing signal to the information network upon playing of a downloaded media program, and provides protection against unauthorized copying. In an alternative configuration, a set-top control card is installed into a host computer system to coordinate the reception and local storage of downloaded media programs, and preferably provides a platform for interfacing with other home communication and electronic systems.

DETAILED DESCRIPTION OF THE PREFERRED EMBODIMENTS

Figure 1:
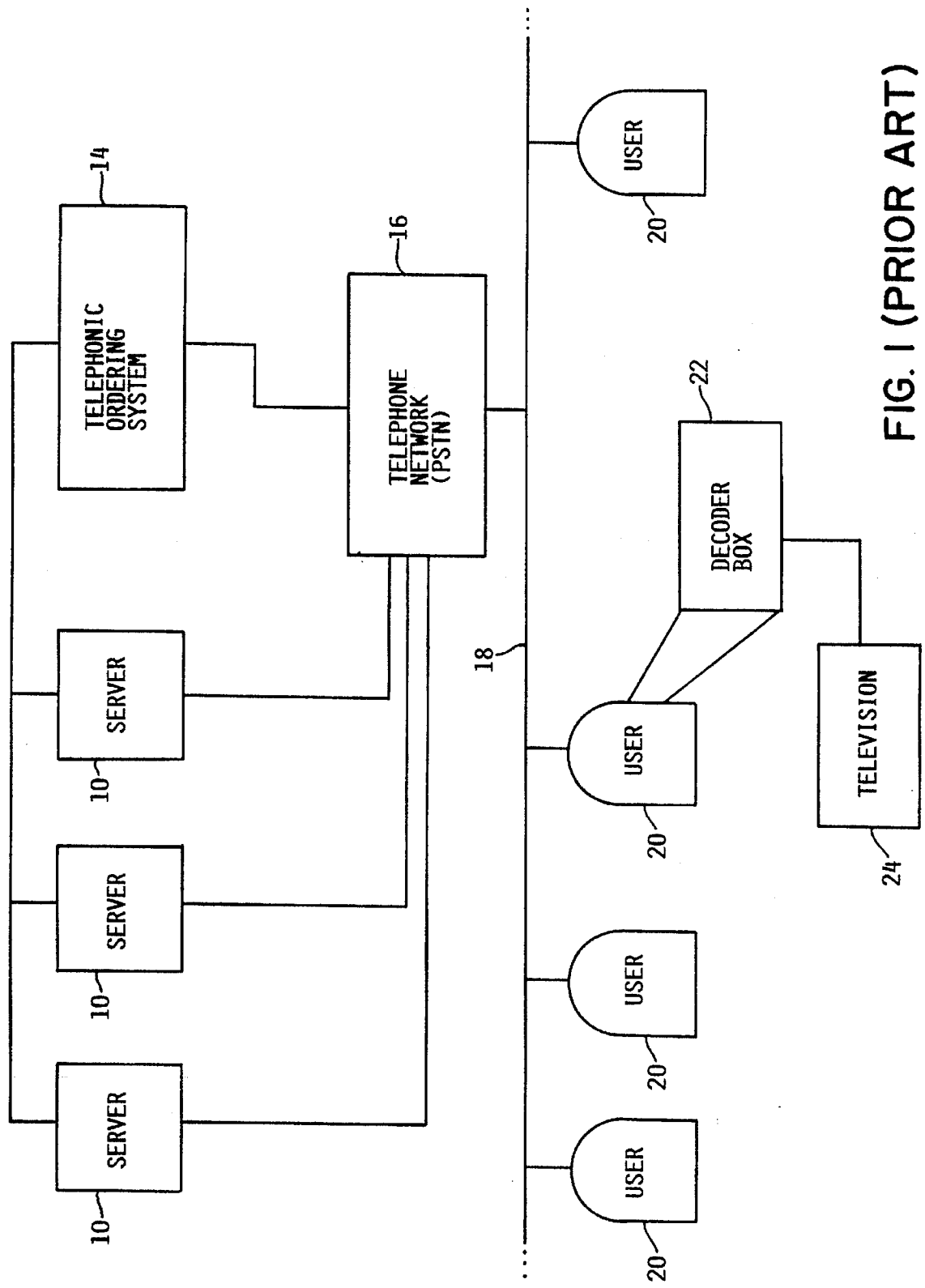
FIG. 1 is a block diagram of a conventional communication system for distributing selected programs to a plurality of users on a pay-per-view basis.
Figure 2:
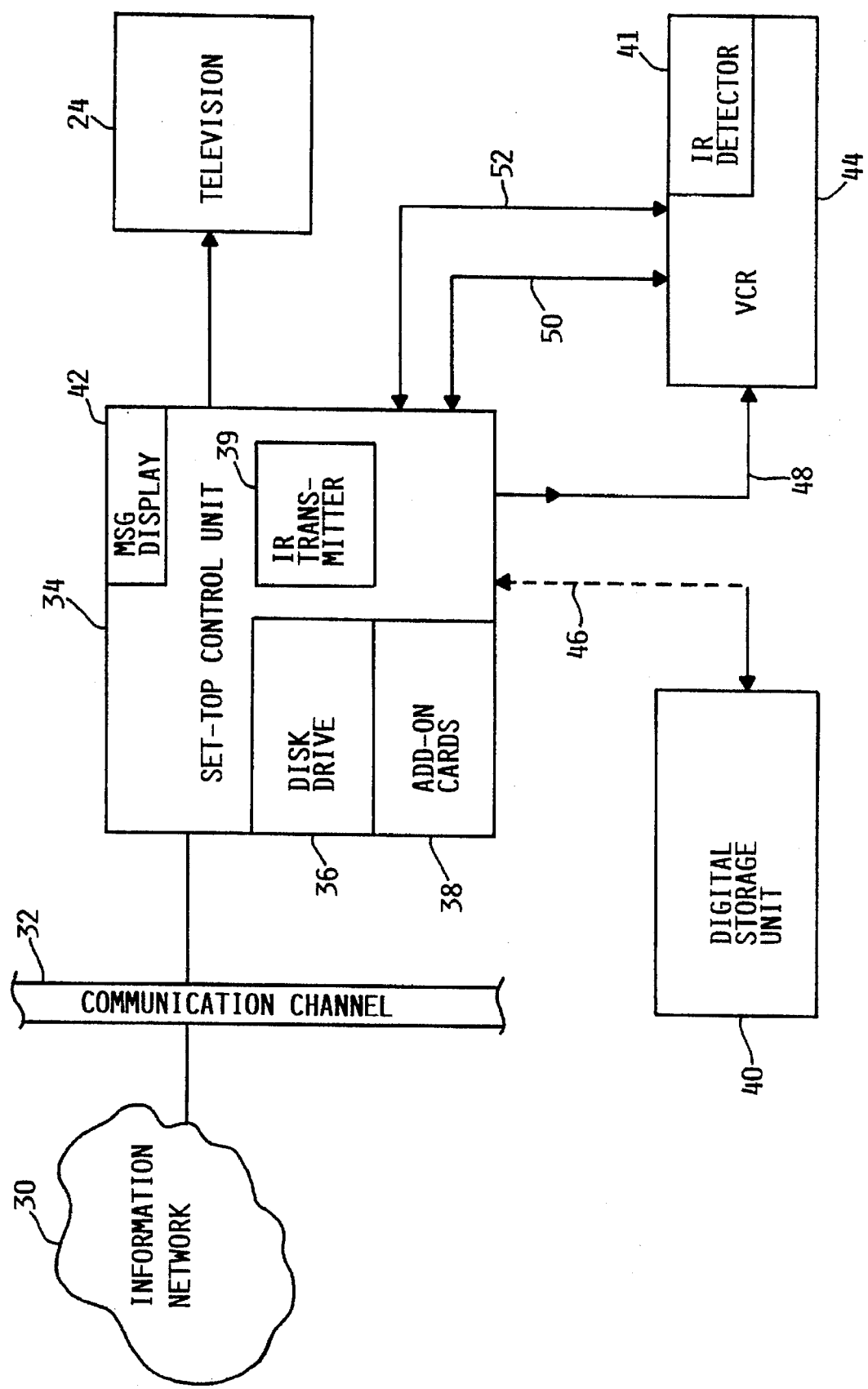
FIG. 2 is a generalized block diagram of a multimedia communication system employing a novel intelligent set-top control unit for coordinating transmission and presentation of user-selected programs on a pay-per view basis.

Referring now to the drawings, and more particularly to FIG. 2, there is shown a multimedia communication system employing a novel set-top control unit 34 adapted for communicating with an information network 30 over a communication channel 32. In one embodiment, the intelligent set-top control unit 34 preferably coordinates the transmission of source information signals between the source information system 30 and a local information storage system. In a preferred embodiment, the local information storage system comprises a standard VCR 44 which is preferably controlled by the set-top control unit 34 to receive and store source information signals, typically representative of multimedia programs, from the source information network 30.

The set-top control unit 34 also coordinates the presentation of source media programs received from the source information network 30 and stored on the VCR 44. Local pay-per-view broadcasting or presentation of a received source media program is preferably facilitated by a home television 24 for viewing video programs, or a home stereo system for listening to audio programs. Alternatively, the source information signals received from the information network 30 are preferably stored in digital form on an internal data storage disk drive 36 or an external digital storage unit 40, for example.

At the customer's convenience, the source program stored in the VCR 44 or digital storage device is presented on the television 24 or stereo system on a pay-per-view basis. Full VCR functionality over the presentation of the program stored in either analog or digital form is provided by the intelligent set-top control unit 34 operating in cooperation with the VCR 44 or digital storage device 36 or 40. Control functionality generally provided by most compact disk (CD) players is also provided by the set-top control unit 34 when broadcasting an audio program stored on the VCR 44 or other storage device.

Customer program orders are preferably made through a menu system presented on the customer's television 24, with menu selections being communicated to the information network 30 through the cable or standard television channel. The menu system may be implemented using known methods similar to those employed for providing on-screen VCR programming. More elaborate menu systems may be implemented in a Windows®-type environment when employing a novel set-top control card 72 in combination with a Windows®-based or Macintosh®-based host computer system 70. As such, the household telephone line is not required to facilitate communication between the pay-per-view multimedia communication system and a plurality of subscribing customer households.

A dramatic decrease in the complexity and cost of operating and maintaining a source information network 30 adapted for distributing multimedia programming to a plurality of customers is realized by employing the novel set-top control unit 34 at each customer location. It is noted that a customer location may be a household, a business location, such as a restaurant or bar, or other private or public forum. VCR-type control functionality, including rewind, fast forward, pause, and other presentation modes are coordinated directly by the set-top control unit 34. By providing local control over the media presentation, the source information network 30 need not be configured to effectuate VCR-type control functions typically desired by the customer during the presentation of a movie or other media program.

Those skilled in the art can readily appreciate the significant difficulty of simultaneously servicing VCR-type control function requests at a central media distribution site during the communication of user-selected programs transmitted to a plurality of customers on a real-time basis. Providing the customer local control of a media presentation directly through the set-top control unit 34 provides for a significant decrease in the bandwidth of the communication channel 32 and the amount of information network 30 processing overhead required to service a plurality of pay-per-view customers.

In a preferred embodiment, the source information signals are representative of a video program, such as a theatrical movie, an audio program, such as a classical symphony recording, or other type of multimedia program, and may include a combination of video, audio, graphical, and textual information. The source information signals are preferably stored in a compressed digital format on one or more media servers 10 comprising the information network 30. The media servers 10 may comprise one or more digital data storage systems, optical data storage systems or digital tape systems. In one embodiment, the media servers 10 may be configured as an array of digital data storage systems operating in accordance with a known RAID (Redundant Array of Inexpensive Disks) architecture and protocol.

The source information signals comprising the source multimedia programs and stored on the media servers 10 are preferably initially converted from an analog format into a digital format, and then compressed or coded in accordance with an established compression algorithm or methodology. The compressed digital source information signals, typically structured in the form of a multiplexed audio/video bitstream, generally comprise a video signal portion, an audio signal portion, and other information signal portions, such as a data and graphics signal portion. When a program is ordered by a subscriber to the novel pay-per-view communication service, a multiplexed source bitstream representative of the selected program is transmitted from the information network 30 to the customer's set-top control unit 34, preferably over an existing television channel, cable television channel, or satellite communication channel 32.

A compression algorithm standard suitable for use in the novel pay-per-view communication system is one developed by the Moving Pictures Experts Group, and is generally referred to as the MPEG video compression standard. The MPEG-1 standard (ISO/IEC IS 11172-1) defines a format for compressed digital video which supports data rates of approximately 1.2 to 1.5 megabits per second (Mbps), resolutions of about 352 pixels (picture elements) horizontally to about 288 lines vertically, picture rates of about 24 to 30 pictures per second, and several VCR-like viewing functions such as normal forward, play, slow forward, fast forward, fast reverse, and freeze. MPEG coding typically provides compression ratios on the order of 150:1. A new developing MPEG standard, referred to in the art as MPEG-2 (ISO/IEC IS 11172-2), is expected to support data rates on the order of approximately 2 to 15 Mbps over cable, satellite, and other broadcast channels. MPEG-2 will additionally support both non-interlaced and interlaced video signal formats, increased image quality, multiple picture aspect ratios, and a number of other advanced features, including features to support High Definition Television (HDTV).

It is noted that the MPEG-1 (ISO/IEC IS 11172-3) and developing MPEG-2 audio compression standards set forth audio compression specifications suitable for coding audio programs stored in the information system 30. It is further noted that the developing MPEG-2 Systems Standard (ISO/IEC IS 11172-2) is expected to support a wide range of broadcast, telecommunications, computing, and storage applications by combining multiple video, audio, and various types of data streams into a single multiplexed stream, thus providing for the transmission, storage, access, and retrieval of the original streams, while maintaining accurate synchronization.

For example, the MPEG-2 Systems Standard will define two kinds of data streams, a Program Stream and a Transport Stream. The Program Stream will provide for the creation of an audiovisual program, for example, which could have multiple views and multichannel audio. The Transport Stream will multiplex a number of programs, typically comprising video, audio, and private data, for transmission and storage using a wide variety of media. The Transport Stream will support multi-program broadcast, storage of single programs on digital videotape, robust performance against channel transmission errors, conditional access to programs, and the maintenance of synchronization over complex communication networks. It is to be understood that compression and system standards other than those conforming to one or more of the above-described MPEG standards may be employed to facilitate communications between the information system 30 and a plurality of customer set-top control units 34 without departing from the scope and spirit of the present invention. For example, source information signals transmitted over the communication channel 32 may be of a format other than a compressed format.

Figure 3:
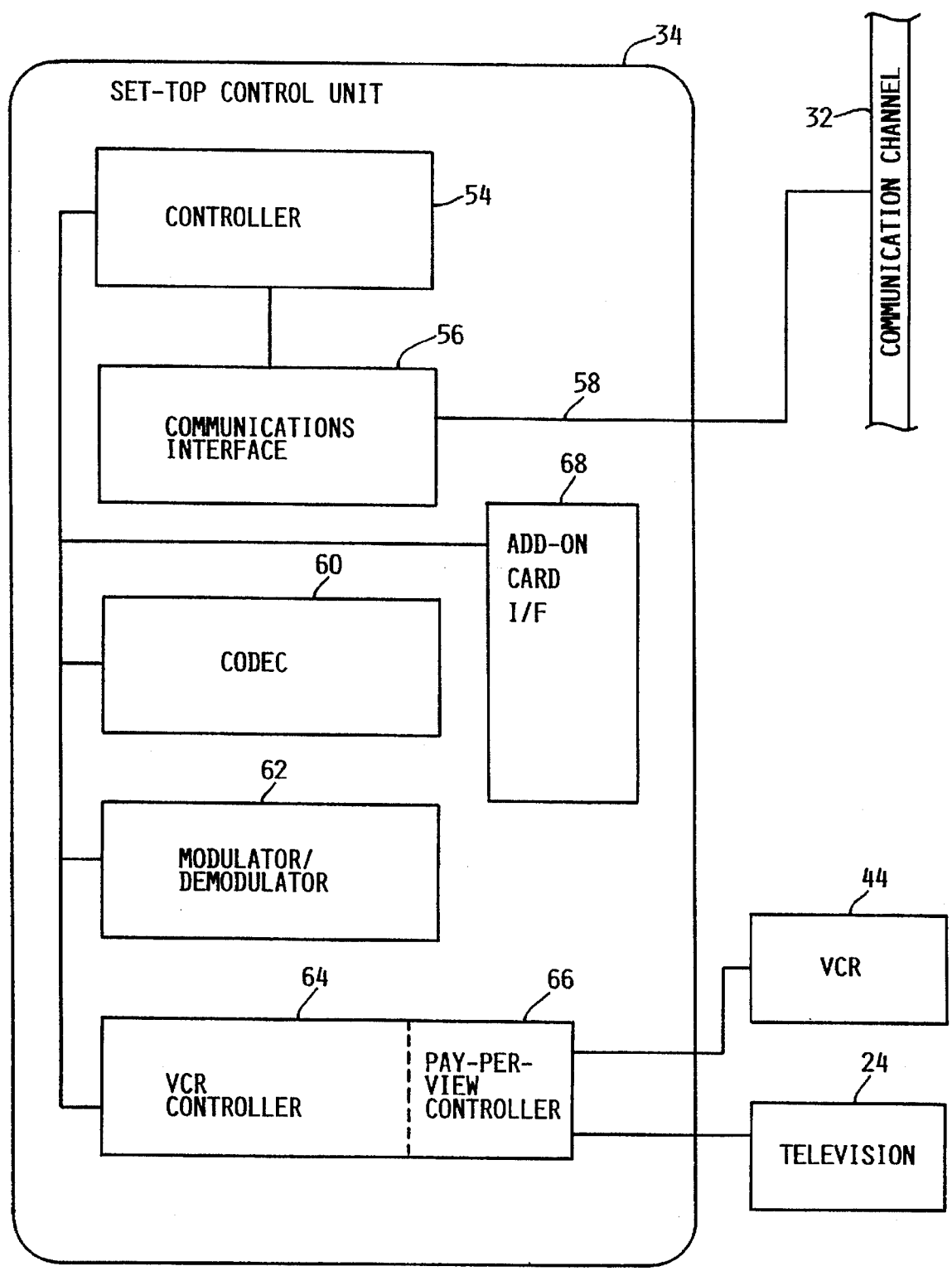
FIG. 3 is an illustration of the system components of a novel intelligent set-top control unit adapted for communicating with an information network and a video cassette recorder to coordinate the transfer of selected multimedia programs from the information network to the video cassette recorder.

With further reference to FIGS. 2 and 3, a user of the intelligent set-top control unit 34 preferably communicates with the information network 30 over an existing communication channel 32, such as a cable television connection. It is understood that a plurality of customers can simultaneously communicate with the information network 30 by use of the set-top control unit 34 preferably situated proximate a television 24 within the customer's home. A communications interface 56 preferably couples the set-top control unit 34 to a cable line 58 or other communication line interfacing with the communication channel 32. The communications interface 56 is preferably a transceiver capable of both receiving and transmitting information, control, and other electrical signals communicated over the communication channel 32. Alternatively, the communications interface 56 may include a receiver and a transmitter for effectuating communication over the communication channel 32.

The set-top control unit 34 preferably communicates control signals to the information network 30 to coordinate the transmission, storage, and presentation of source information program signals. The intelligent set-top control unit 34 also communicates with the VCR 44 or other storage device 40 and 36 to provide the customer with full VCR-type control functionality, such as fast forward, reverse, and pause functions, and to ensure that the customer is billed for each presentation of a source program downloaded from the information network 30 and stored on the VCR 44.

An important feature of the present invention concerns the preservation of a consumer's investment in a previously purchased VCR 44. As previously mentioned, it is estimated that seventy-three percent (73%) of all homes having a television in the United States also contain at least one analog VCR 44. The present invention preserves a customer's $250 to $400 investment in the VCR 44 by incorporating the VCR 44 as a storage device for the source information signals received from the information network 30. Full VCR control functionality is thus afforded locally to the customer by cooperative operation between the set-top control unit 34 and the VCR 44. Additionally, traditional use of the VCR 44 remains unaffected, allowing for playback of consumer recorded or rental tapes directly through the set-top control unit 34.

Further, media programs downloaded from the information network 30 are preferably received and stored on the VCR 44 in the background, thus allowing the consumer to simultaneously review other information network programming selections or to enjoy traditional television programming. Protection against unauthorized copying of downloaded programs is also provided to preserve the production and distribution investment of the copyright owner of the media presentation. Other home electronic and communication systems are also preferably controlled through the set-top control unit 34 through the use of various add-on cards 38 for interfacing with such other systems.

Referring now to FIG. 3, there is shown various components of the intelligent set-top control unit 34 which communicate with a customer's VCR television 24, and the information network 30 over the communication channel 32. A controller 54 preferably coordinates the transfer of source information signals from the information network 30 to the VCR 44, and the presentation of source programs on the television 24. A communications interface 56 preferably receives source information signals from the communication channel 32 representative of a pre-selected media program. The source information signals are preferably received in a compressed format which are then decoded by the coder/decoder (CODEC) 60. A compressed source information signal is generally a multiplexed source bitstream typically comprising both audio and video signal information. The CODEC 60 preferably extracts the video and audio bitstreams from the multiplexed source bitstream, decodes the audio and video bitstreams, and synchronizes the decoded analog video and audio signals for storage on the VCR 44. The CODEC 60 also decodes and parses graphical, textual, and other data streams from the multiplexed source bitstream.

In one embodiment, the controller 54 includes an NTSC (National Television Systems Committee) decoder for decoding NTSC formatted video signals. In another embodiment, the controller 54 includes a PAL (Phase Alternating Line) decoder for decoding video signals conforming to the european PAL standard. Alternatively, a combined NTSC/PAL decoder may be employed to detect and decode either NTSC or PAL formatted video signals. The NTSC standard specifies a video frame rate of thirty video frames per second, while the PAL standard prescribes a video frame rate of twenty-five video frames per second, to maintain full-motion video. The NTSC/PAL decoder preferably decodes NTSC video signals to corresponding CIF240 resolution image data (352×244), and PAL video signals to corresponding CIF resolution image data (352×288). A CIF240 resolution image is recognized as a standard image format for domestic video display devices, while a CIF (and QCIF) resolution image is recognized as an international or european standard image format.

A modulator/demodulator 62 is preferably employed to modulate or scramble the decoded analog audio and video signals prior to being stored on the VCR 44 in accordance with a predetermined security format. In one embodiment, each set-top control unit 34 is identified by a unique serial number. This serial number is preferably used as an address when routing source information signals from the information network 30 to the set-top control unit 34 of the subscribing customer who placed the pay-per-view order. Additionally, the serial number unique to a specific set-top control unit 34 may be used to determine the method and manner of modulating the decoded analog presentation signal before being transmitted to the VCR 44. Alternatively, any one of a number of known signal modulation techniques may be employed to scramble the decoded source information signal to prevent copying of the downloaded program. As such, any attempt to copy the downloaded program or play the downloaded program on another VCR 44 or otherwise bypass the set-up control unit 34 will result in a significantly degraded or unintelligible program signal. The modulator/demodulator 62 preferably descrambles the modulated source information signal stored on the VCR 44 prior to being transmitted to the television 24 for presentation.

An advantageous feature of the intelligent set-top control unit 34 concerns a true pay-per-view billing capability previously unaddressed by prior art pay-per-view communication systems. Such prior art systems typically charge a subscribing customer for viewing a particular media presentation at the time of transmitting the program to the customer, and thereafter are incapable of billing the customer for subsequent replaying of the program. Other systems, for example, provide for automatic erasure of a transmitted program after an initial viewing, thereby precluding future viewing by other members of the family or audience not present at the time of the initial viewing.

The present invention incorporates a pay-per-view controller 66 which detects each playing of the downloaded presentation from the VCR 44, and communicates a billing signal to the information network 30 in response to each presentation of a downloaded source program. Accordingly, each subsequent viewing of the downloaded presentation is detected by the intelligent set-top control unit 34, thus allowing for automatic billing of each program presentation to the customer's account. The true pay-per-view control feature of the present invention is particularly advantageous when the set-top control unit 34 is employed as part of a media entertainment installation at a public forum, such as a restaurant or bar, where repetitive presentation of media programs, such as music videos, is desirable.

In a preferred embodiment, the intelligent set-top control unit 34 communicates a VCR control signal to the VCR 44 over a VCR control channel or line 50, and communicates a local readiness control signal to the information network 30 indicating that the VCR 44 is configured for receiving and storing source information signal transmissions from the information network 30. The set-top control unit 34 preferably communicates with the VCR 44 to verify, for example, that a video cassette is loaded into the VCR 44, and that the VCR 44 record mode has been selected. A local readiness control signal is then transmitted by the set-top control unit 34 to the information network 30 indicating the present readiness of the VCR 44 to receive a downloaded program transmission.

During the information network 30 download procedure, source information signals received over the communication channel 32, typically in a compressed digital form, are decoded into an analog presentation signal by the CODEC 60 and transmitted to the VCR 44 over the VCR input line 48. As previously discussed, a modulator/demodulator 62 may be employed to modulate the decoded analog presentation signal prior to being stored on the VCR 44. An analog video output port of the VCR is preferably coupled to the set-top control unit 34 by the VCR output line 52 for transferring previously stored analog presentation signals from the VCR 44 for presentation on the television 24. Each presentation of the downloaded media program is preferably monitored by the pay-per-view controller 66 which communicates a billing signal to the information network 30. It is important to note that standard analog VCR output signals as well as modulated video signals are transmitted to the set-top control unit 34 over the VCR output line 52 for presentation on the television 24.

The set-top control unit 34 preferably controls the VCR 44 by exploiting the control functions inherent in the VCR 44. For VCRs 44 employing infrared (IR) remote control handsets, the set-top control unit 34 is preferably configured with an IR transmitter 39 that emulates the control signals of the VCR's remote control handset. The set-top control unit transmitter 39 is preferably placed in proximity to the IR detector 41 typically mounted on the front panel of the VCR 44. Conventional control functions for the VCR, such as rewind, fast forward, pause, and the like are thus transmitted by the set-top control unit transmitter 39 and received by the VCR detector 41 to control the operation and functionality of the VCR 44.

The response of the VCR 44 to set-top control unit 34 control signals is preferably monitored by sampling the video output signal from the VCR 44. The standard video output port for NTSC or PAL formatted video signals is suitable for monitoring the operational status of the VCR 44. Monitoring of one or more video output ports from the VCR 44 provides a means for detecting, for example, whether the VCR 44 is recording the program being downloaded from the information network 30. When the VCR 44 is recording, it is possible to detect horizontal sync pulses that are generally present in the recorded presentation signal. An absence of such horizontal sync pulses typically indicates that the recording operation has been completed.

Another important advantage of the present invention concerns the optimization of information network 30 operations during periods of peak server 10 utilization. During periods of high media server 10 demand, the pause function of the VCR 44 is preferably controlled by the set-top control unit 34 to temporarily halt reception of source information signals from the information network 30. The set-top control unit 34 preferably communicates with the information system 30 to coordinate further transmission of the source program. When optimizing the distribution of source information signals to a plurality of set-top control units 34, a pause command is preferably communicated to specified VCRs 44 to temporarily halt the transmission and recording operation. Transmission and recording preferably resumes when the media server 10 load is reduced. Selective control of the media download process between the information system 30 and a plurality of set-top control units 34 preferably provides a means for balancing the distribution of subscriber ordered program transmissions during peak periods of demand.

The communication interface 56 preferably includes a buffer or other memory adapted for temporarily storing source information signals during the information system 30 optimization procedure to minimize any gaps that may otherwise occur when halting and starting the recording operation of the VCR 44. Alternatively, the media server 10 preferably encodes a pause command signal into the downloaded source bitstream indicating that a temporary halting of the download process is required. When received by the communications interface 56, the set-top control unit 34 preferably issues a pause command to the VCR 44 until a resume command signal and additional source bitstream data is received from the information network 30. The set-top control unit 34 may alternatively sense a delay of a predetermined time period in the transmission of source information signals from the information network 30, and issue a corresponding pause command to the VCR 44 during such periods of delayed transmission.

Figure 4:
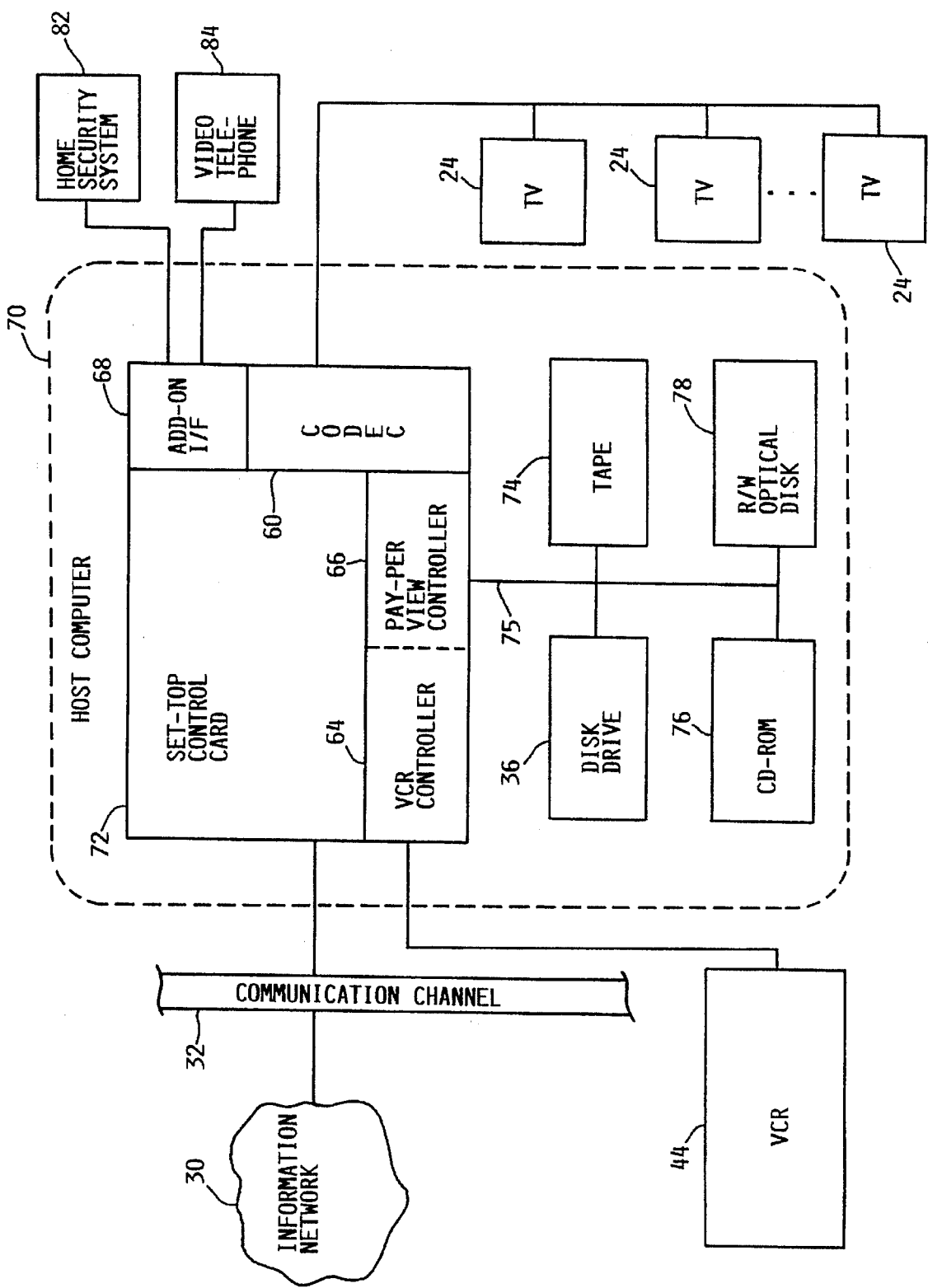
FIG. 4 is a generalized block diagram of a multimedia communication system employing a novel intelligent set-top control card installed in a host computer system adapted for coordinating the transfer of user-selected programs from an information network to a mass storage device on a pay-per view basis, and for communicating with other home information systems.

Turning now to FIG. 4, there is shown an alternative preferred embodiment of the intelligent multimedia set-top control method and apparatus employing a set-top control card 72 installed in a host computer system 70. In one configuration, the set-top control card 72 preferably incorporates the system components and functionality substantially similar to those previously discussed with respect to the set-top control unit 34 illustrated in FIGS. 2 and 3. In a preferred configuration, the set-top control card 72 is installed into the host computer system 70 to provide a home communications platform capable of coordinating the transmission and storage of selected programs from the information network 30, and the presentation of downloaded programs to one or more televisions 24 situated throughout a customer's household or premises. The downloaded programs may be stored on an analog VCR 44 in a manner similar to that previously discussed, or may alternatively be stored on one of a number of alternative mass storage devices.

A data storage disk drive 36, for example, may be employed to store the downloaded program information. Digital tape 74, CD-ROM 76, or a read/write optical disk 78 storage device may also be employed. The home media server 70 may be configured to incorporate a plurality of storage devices, such as an array of data storage disk drives 36, for asynchronously distributing downloaded stored programs to a plurality of televisions 24 distributed throughout the customer's household or premises. Communication between the set-top control card 72 and digital storage device is preferably facilitated over a SCSI (Small Computer Systems Interface) or PCMCIA (Personal Computer Memory Card Industry Association) interface 75. Preferably, a television 24 viewer may independently select media programs stored on the data storage disk drive 36 array, and independently effectuate VCR-type control functions such as fast forward, reverse, and pause. A RAID data storage disk drive 36 configuration is suitable for providing simultaneous distribution and control of stored media programs to a plurality of household viewers. This configuration is particularly advantageous for use by hotels, motels, apartments, and other types of public or private housing when providing pay-per-view entertainment to a plurality of parties on an on-demand basis.

Figure 5:
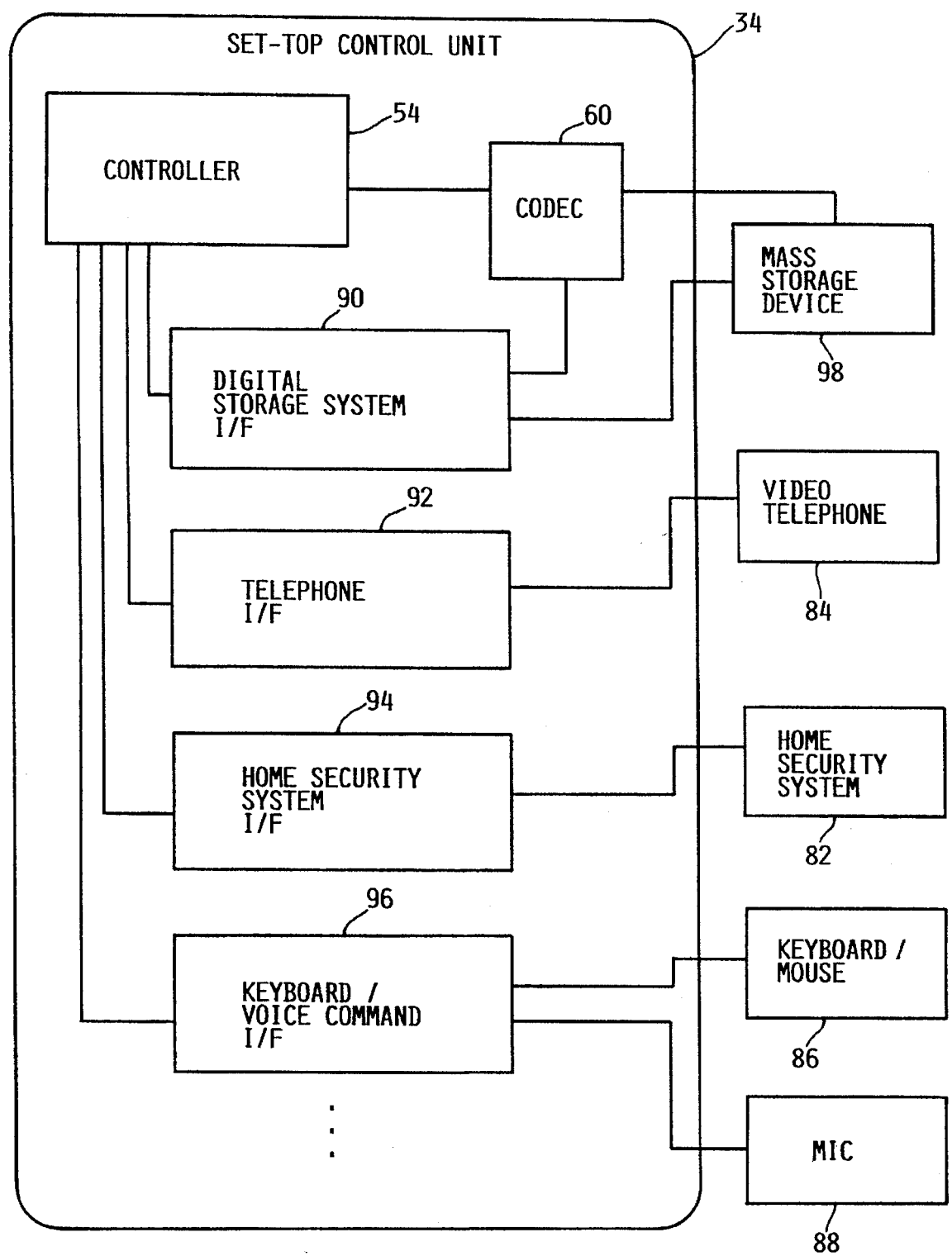
FIG. 5 is a depiction of various home information systems which can be interfaced with a novel intelligent set-top control unit or set-top control card installed in a host computer system and configured as a home communication server.

The intelligent multimedia set-top control method and apparatus provides a platform for effectuating comprehensive information networking by interfacing with a number of other household information systems. In the configurations illustrated in FIGS. 2, 4, and 5, the set-top control unit 34, or host computer system 70 incorporating a set-top control card 72, provides a platform for coordinating all or most household or local communications. Various add-on interface cards or devices 68 are preferably employed to communicate with information systems commonly found in many homes, hotels, and motels. Additionally, the flexibility of the intelligent multimedia set-top control method and apparatus provides for easy expandability to accommodate state-of-the art and future information and communication systems.

By way of example, a digital storage system interface 90 may be coupled to the controller 54 of the set-top control unit 34, or alternatively, to the controller of the host computer system 70, to facilitate the transfer of downloaded source programs and other information from the information network 30 to one or more external digital mass storage devices 98. Data compression and decompression is preferably provided by a CODEC 60 coupled to the digital storage system interface 90 and mass storage device 98. By way of further example, a telephone interface 92 preferably provides access to analog and ISDN or other digital telephone lines 84 for effectuating audio as well as video telephone communication, often referred to as video conferencing. It is to be understood that the communications interface 56 of the set-top control unit 34 or set-top control card 72 may be utilized to support audio and video conferencing between, for example, a local and remote set-top control unit 34 over a cable or standard television communication channel 32.

A CODEC 60 may also be employed to code and decode audio and video telephonic or cable information signals transmitted between the set-top control unit 34 or set-top control card 72 and a remote communicating party. A suitable telephony communication standard for communicating audio/video information is the CCITT H.320 standard promulgated by the Consultative Committee on International Telephony and Telegraphy, a body of the International Telegraph Union (ITU) established by the United Nations. The CCITT H.320 video conferencing standard includes several sub-standards, including a video compression standard H.261, a channel coding standard H.221, and audio compression standards G.711, G.722, and G.728.

Home communications and system configuration parameters may be controlled directly by the local user through the use of a keyboard or mouse 86, or, alternatively, through the use of voice commands input to a microphone 88 and coupled to a keyboard/voice command interface 96. It is to be understood that other information systems may be coupled to the set-top control unit 34 or host computer system 70 by incorporating additional interface cards or devices. For example, fax and modem cards may be installed in, or coupled to, the set-top control unit 34 or set-top control card 72. Access to electronic mail services and local or wide area networks may be facilitated by installing a network interface card. A home security system interface card 94 may be installed to interface with a home security or fire system 82. Automatic dialing and reporting of an emergency condition to the appropriate authorities may be provided through a modem coupling the set-top control unit 34 or card 72 to the household telephone line, or through the communications interface 56 coupling the set-top control unit 34 or card 72 to a cable or standard television communication channel 32. Accordingly, the intelligent set-top control unit 34, or control card 72 operating in cooperation with a host computer system 70, can provide efficient and effective centralized control over all or most household communications and other electronic systems.

Figure 6:
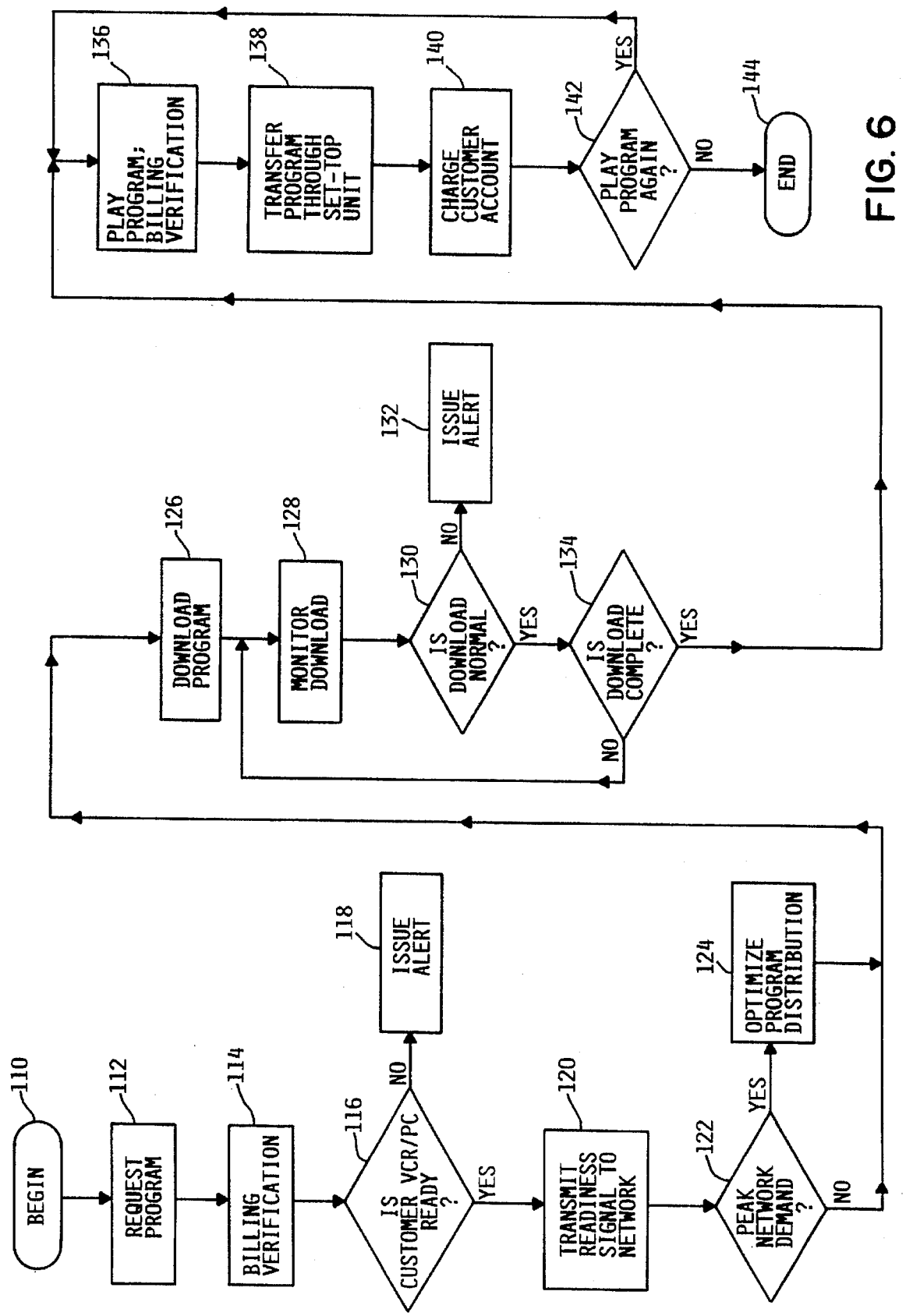
FIG. 6 is a generalized flow diagram of a method for effectuating true pay-per-view distribution of user-selected programs from an information network to a plurality of customers having in their home a novel intelligent set-top control unit or set-top control card installed in a host computer system.

Referring now to FIG. 6, there is shown an illustration of a flow diagram pictorially describing the method steps for effectuating pay-per-view communication of multimedia programs to a plurality of subscribing customers each having an intelligent multimedia set-top control unit 34 or set-top control card 72 installed in a host computer system 70. At step 110, connectivity is established between the information network 30 and set-top control unit 34 or card 72 through the communication channel 32, preferably a cable television channel. It is noted that existing cable and conventional television broadcast systems typically reserve one or more communication channels for the purpose of providing pay-per-view presentation of multimedia programs, including theatrical movies, sports events, audio programs, and other audio/video presentations. A customer may request one or more desired programs at step 112, preferably by selecting specific media programs from an on-screen menu presented on the customer's television 2. In one configuration, the VCR or television remote control hand set may be used to perform on-screen program selections. Alternatively, a touch-screen menu selection capability may be provided for selecting one or more desired programs. At step 114, a customer's account and billing history is preferably verified prior to transmitting the selected programs to the customer's home.

The set-top control unit 34 preferably interrogates the VCR 44 or other storage device to ensure its readiness to accept source information signals from the information network 30. If, at step 116, the VCR 44 or storage device is not presently configured to receive the transmitted source program, the set-top controller 34 preferably issues an alert message at step 118. An alert condition is preferably communicated to the customer via a message display 42 or other annunciator disposed on the set-top control unit 34. At step 120, a readiness control signal is transmitted to the information network 30 indicating the present readiness of the set-top control unit 34 or card 72 to coordinate reception and storage of the selected programs. During periods of peak media server 10 demand, the information network 30, at steps 122 and 124, preferably executes an optimization procedure to efficiently distribute selected programs to a plurality of set-top control units 34 as previously discussed.

At step 126, a selected program is downloaded or transferred to the customer's set-top control unit 34 or card 72.

The download procedure is monitored periodically or continuously at step 128 to ensure integrity of the data transmission. It is noted that various known error detection and correction methods, such as a CRC or ECC error detection scheme, may be employed to enhance the integrity of the source information signal transmission. At steps 130 and 132, an alert signal is preferably produced and displayed on the message display 42 in the event of a significant transmission error. In a configuration employing a VCR 44 for storing the downloaded program, the NTSC or PAL video output port is preferably monitored by the set-top control unit 34 or card 72 to detect the presence of horizontal sync pulses indicative of normal VCR recording.

After completion of the download procedure, a customer may then play or listen to the program at step 136 on a pay-per-view basis. Prior to each customer request for a pay-per-view program presentation, the set-top control unit 34 or card 72 communicates with the information system 30 to verify the current status of the customer's account, and to determine whether the customer's request to view or listen to the downloaded program is authorized. After proper account verification, the stored program is transferred from the storage device, such as the VCR 44, to the set-top control unit 34 or card 72 prior to being presented on the customer's television 24 or stereo system. The pay-per-view controller 66, at steps 138 and 140, preferably communicates a billing signal to the information network 30, resulting in an appropriate charge being assessed to the customer's account. Any subsequent re-playing of the program, at step 142, is detected and appropriately billed to the customer's account in accordance with steps 136 through 140.

It will, of course, be understood that various modifications and additions can be made to the embodiments discussed hereinabove without departing from the scope or spirit of the present invention. For example, a pay-per-view customer may select one or plurality of media programs. The selected media programs may be individual or a combination of media selections, such as video movie, audio recordings, textual and graphical information, and other multimedia programs. Accordingly, the scope of the present invention should not be limited to the particular embodiments discussed above, but should be defined only by the claims set forth below and equivalents of the disclosed embodiments.

What is claimed is:

1. A method for communicating on a pay-per-view basis multimedia programs from a source information network to a local set-top control means having local storage means, the communication method comprising the steps of:

providing a source information network selection menu of at least one media program;

communicating to the source information network a readiness control signal indicating local storage means readiness to receive a media program;

transmitting the media program to the local set-top control means;

storing the transmitted media program on the local storage means; and communicating to the source information network a billing signal in response to presentation of the stored media program.

2. A method as claimed in claim 1, further including the step of controlling the presentation of the stored media program.

3. A method as claimed in claim 1, wherein the step of storing the media program includes the step of modulating an information signal of the transmitted media program.

4. A multimedia communication system comprising:

a source information system for distributing source information signals;

a local control system for communicating with the source information system over a communication channel;

a local storage device for storing source information signals received from the source information system; and local monitoring means for communicating a billing signal to the source information system upon presentation of the stored information signals;

wherein the local control system communicates with the source information system to coordinate transmission of the source information signals between the source information system and the local storage device, and to communicate the billing signal to the source information system upon presentation of the stored information signals.

5. A system as claimed in claim 4 wherein the source information system comprises menu selection means for providing selection of a media program from a plurality of media programs stored in the source information system.

6. A system as claimed in claim 4, wherein the local storage device comprises a data storage system having at least one data storage disk.

7. A system as claimed in claim 4 wherein:

the local storage device comprises a video cassette recorder/player; and the local control system comprises means for controlling the video cassette recorder/player.

8. A system as claimed in claim 7, wherein the means for controlling the video cassette recorder/player comprises an infrared transmitter for transmitting control signals between the local control system and an infrared detector disposed on the video cassette recorder/player.

9. A system as claimed in claim 4, wherein:

the local control system comprises a local control card adapted for installation in a host computer system; and the local storage device comprises a data storage system having at least one data storage disk.

10. A local information control system adapted for communicating with a separate local storage device and a remotely located source information system over a television communication channel, the local information control system comprising:

a controller for communicating with the source information system;

a storage device interface for communicating between the controller and the local storage device source information signals received from the source information system; and monitoring circuitry for communicating a billing signal to the source information system upon presentation of the stored information signals;

wherein the controller communicates with the source information system to coordinate transmission of the source information signals between the source information system and the local storage device, and communicates the billing signal to the source information system upon presentation of the stored information signals.

11. A system as claimed in claim 10, wherein the controller produces a local readiness control signal indicative of controller readiness to receive the source information signals from the source information system.

12. A system as claimed in claim 10, wherein the controller produces a local status control signal to the source information system indicative of the status of the local storage device.

13. A system as claimed in claim 10, wherein the local storage device comprises a video cassette recorder/player.

14. A system as claimed in claim 10, wherein the local storage device comprises a data storage system having at least one data storage disk.

15. A system as claimed in claim 10, wherein:

the local storage device comprises a video cassette recorder/player; and the controller comprises means for controlling the video cassette recorder/player.

16. A system as claimed in claim 10, wherein:

the controller comprises a local control card adapted for installation in a host computer system; and the local storage device comprises a data storage system having at least one data storage disk.

17. A local information control system adapted for communicating with a remotely located source information system over a television communication channel comprising:

local control means for communicating with the source information system;

local storage means for storing source information signals received from the source information system; and local monitoring means for communicating a billing signal to the source information system upon presentation of the stored information signals;

wherein the local control means communicates with the source information system to coordinate transmission of the source information signals between the source information system and the local storage means, and communicates the billing signal to the source information system upon presentation of the stored information signals.

18. A system as claimed in claim 17, wherein the source information signals are representative of a source media program comprising at least one of a video signal portion, an audio signal portion, and a multiplexed video and audio signal portion.

19. A system as claimed in claim 17, wherein the local control means comprises means for communicating a local readiness control signal to the source information system indicative of local control means readiness to receive the source information signals from the source information system.

20. A system as claimed in claim 17, wherein the local control means comprises means for communicating a local status control signal to the source information system indicative of the status of the local storage means.

21. A system as claimed in claim 17, wherein the local control means comprises means for modulating the received source information signal.

22. A system as claimed in claim 17, wherein the source information signals comprise a source control signal, and the local control means comprises means for configuring the local storage means for storing the source information signals in response to the source control signal.

23. A system as claimed in claim 17, wherein the local storage means comprises a video cassette recorder/player for storing the source information signals.

24. A system as claimed in claim 17, wherein the local storage means comprises a data storage system having at least one data storage disk for storing the source information signals.

25. A system as claimed in claim 17, wherein:

the local storage means comprises a video cassette recorder/player; and the local control means comprises means for controlling the video cassette recorder/player.

26. A system as claimed in claim 25, wherein the means for controlling the video cassette recorder/player comprises an infrared transmitter for transmitting control signals between the local control means and an infrared detector disposed on the video cassette recorder/player.

27. A system as claimed in claim 17, wherein:

the local control means comprises a local control card adapted for installation in a host computer system; and the local storage means comprises a data storage system having at least one data storage disk for storing the source information signals.

28. A system as claimed in claim 17, wherein the local information control system further comprises interface means for communicating audio and video signals over a telephone communication line.

29. A system as claimed in claim 17, wherein the local information control system further comprises interface means for communicating with a local information system.

* * * * *